Figure 1:
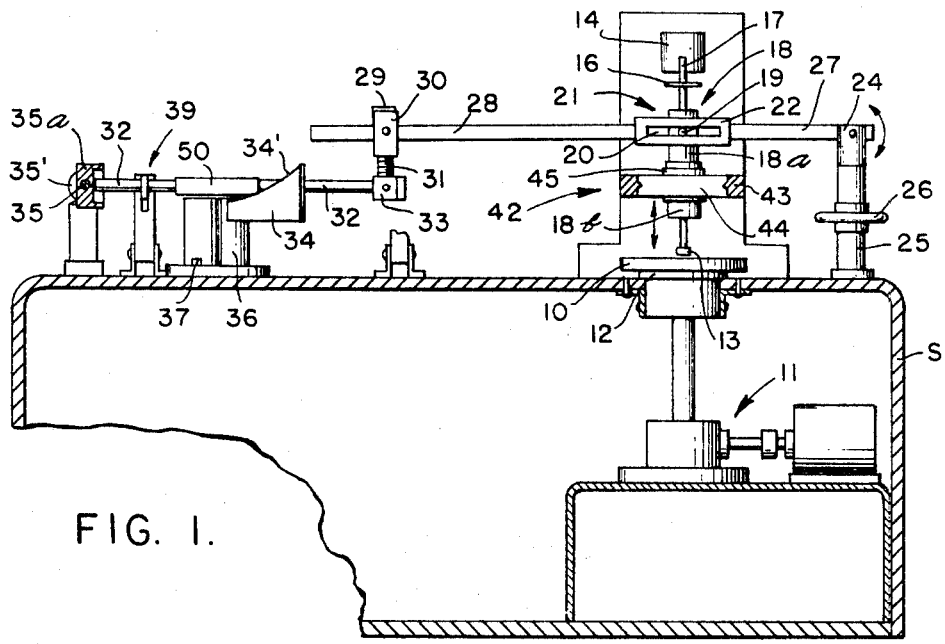

Sept. 20, 1966     R. W. DIETZ ET AL     3,273,289

ASPHERIC SURFACE GENERATOR

Filed Sept. 16, 1963     3 Sheets-Sheet 1

INVENTORS.
RALPH W. DIETZ
HAROLD E. BENNETT
BY

*P. H. Firsht*

ATTORNEY.

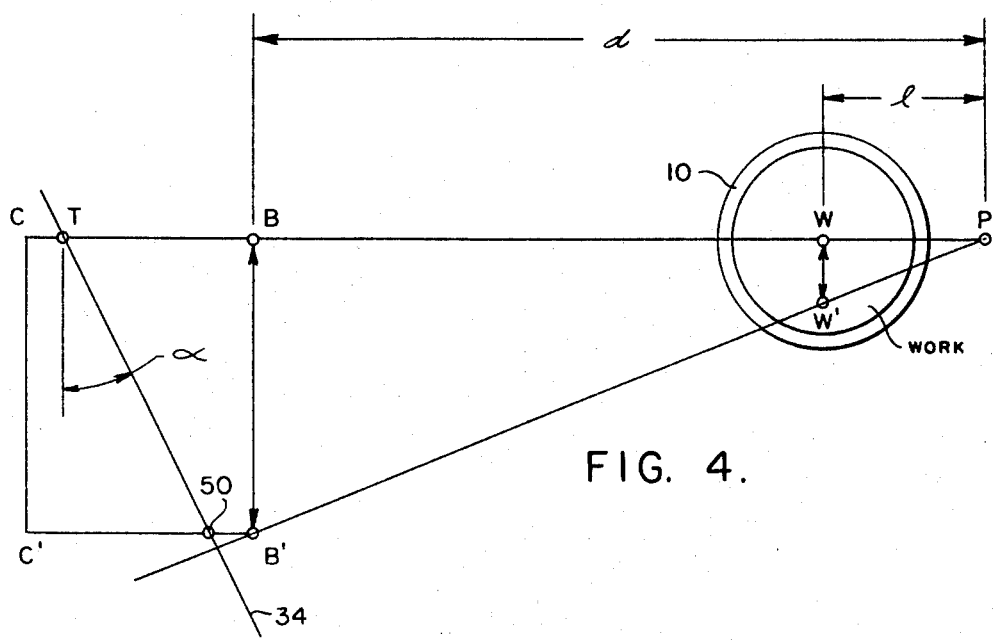
FIG. 4.
FIG. 5.
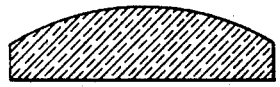
FIG. 6.
FIG. 7.
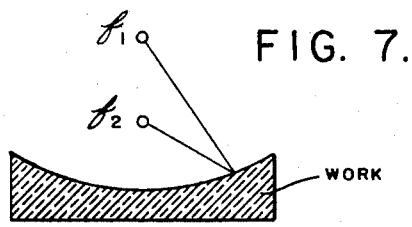
INVENTORS.
RALPH W. DIETZ
HAROLD E. BENNETT United States Patent Office 3,273,289
Patented Sept. 20, 1966

3,273,289
ASPHERIC SURFACE GENERATOR
Ralph W. Dietz, 106-B Bard, and Harold E. Bennett, 1501-B Smith Road, both of China Lake, Calif.
Filed Sept. 16, 1963, Ser. No. 309,356
5 Claims. (Cl. 51—127)

The invention described herein may be manufactured and used by or for the Government of the United States of America for governmental purposes without the payment of any royalties thereon or therefor.

The present invention relates generally to a surface shaping machine for generating curved surfaces, and more particularly to an apparatus for facilitating the production of aspheric mirrors, lenses, and the like.

Peculiarly shaped profiles for aspheric mirrors and lenses cannot be readily formed utilizing conventional lens-grinding machines, as the use of such machines entail techniques of "cut-and-try" including the steps of grinding away high spots from a generated spherical surface, then polishing, testing, and correcting the remaining high spots by repeating the steps of grinding, polishing, and testing.

Another method which has been employed to obtain an aspheric surface utilizes a spherical generator for first producing a series of spherical steps having tangents approximating a desired aspheric surface so that the surface may be finally ground to a desired shape through the above-described polishing, testing, and correcting techniques.

While the foregoing methods have been found to be satisfactory for producing desired profiles, these methods are not economically feasible in that they are quite time consuming and must be preformed by highly skilled artisans.

In order to accommodate the ever increasing demand for aspheric mirrors and lenses, certain attempts have been made to provide machines for economically producing the required surfaces.

Presently available machines utilize one of a plurality of templates provided for guiding the working point or grinding surface in a fashion which permits the template to impart its shape to the resulting mirror or lense in minification. While these machines function satisfactorily once they are set up, they are limited in scope as they require the use of a new template for each specific surface configuration desired. Each new template involves an expensive fabrication technique, and, as in most instances, only a limited number of aspheric mirrors or lenses are to be formed having a specific focal ratio, diameter, and type of curve. Therefore, the average costs for each aspheric mirror or lens ordinarily is magnified out of proportion, due to the requirement that a specific template be provided for each series of surfaces to be generated.

It is the purpose of the instant invention to provide a device which retains the advantages afforded through the use of the aforementioned techniques and machines, while eliminating the undesired foregoing limitations. To attan this result, the present invention incorporates a single, pivotally mounted template of a type which may be displaced through a series of determinable angles in order to accommodate a generation of a plurality of curved surfaces having variations in their surface characteristics.

An object of the present invention is to provide a simplified device for enhancing formation of ground surfaces.

Another object is to provide a device for economically generating aspheric mirrors, lenses and the like.

A further object is to provide an aspheric surface generator with a single template capable of being utilized for forming a plurality of curved surfaces.

And still a further object is to provide a simplified aspheric surface generator being capable of generating a curved surface with a high degree of accuracy.

Figure 2:
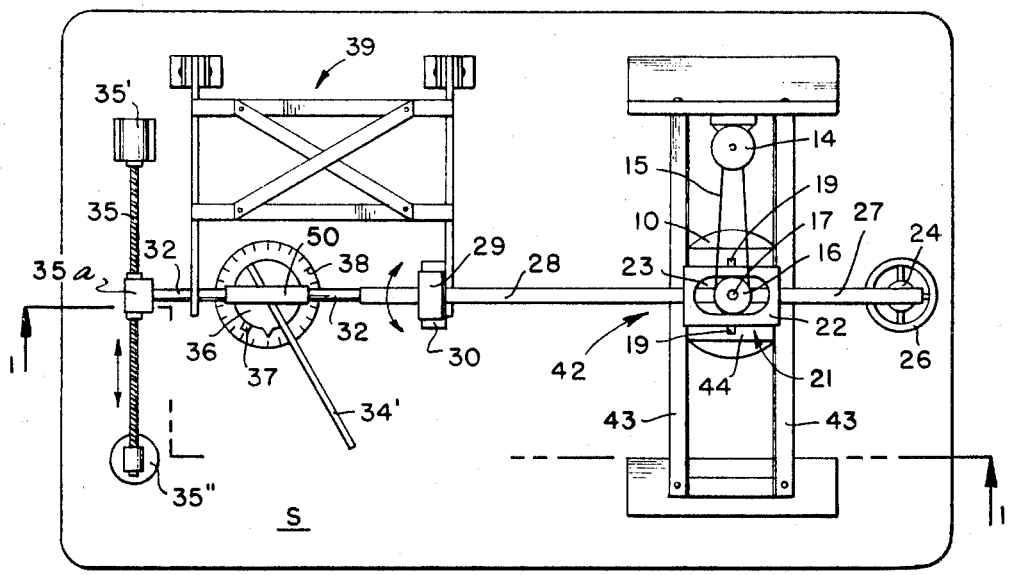
Figure 3:
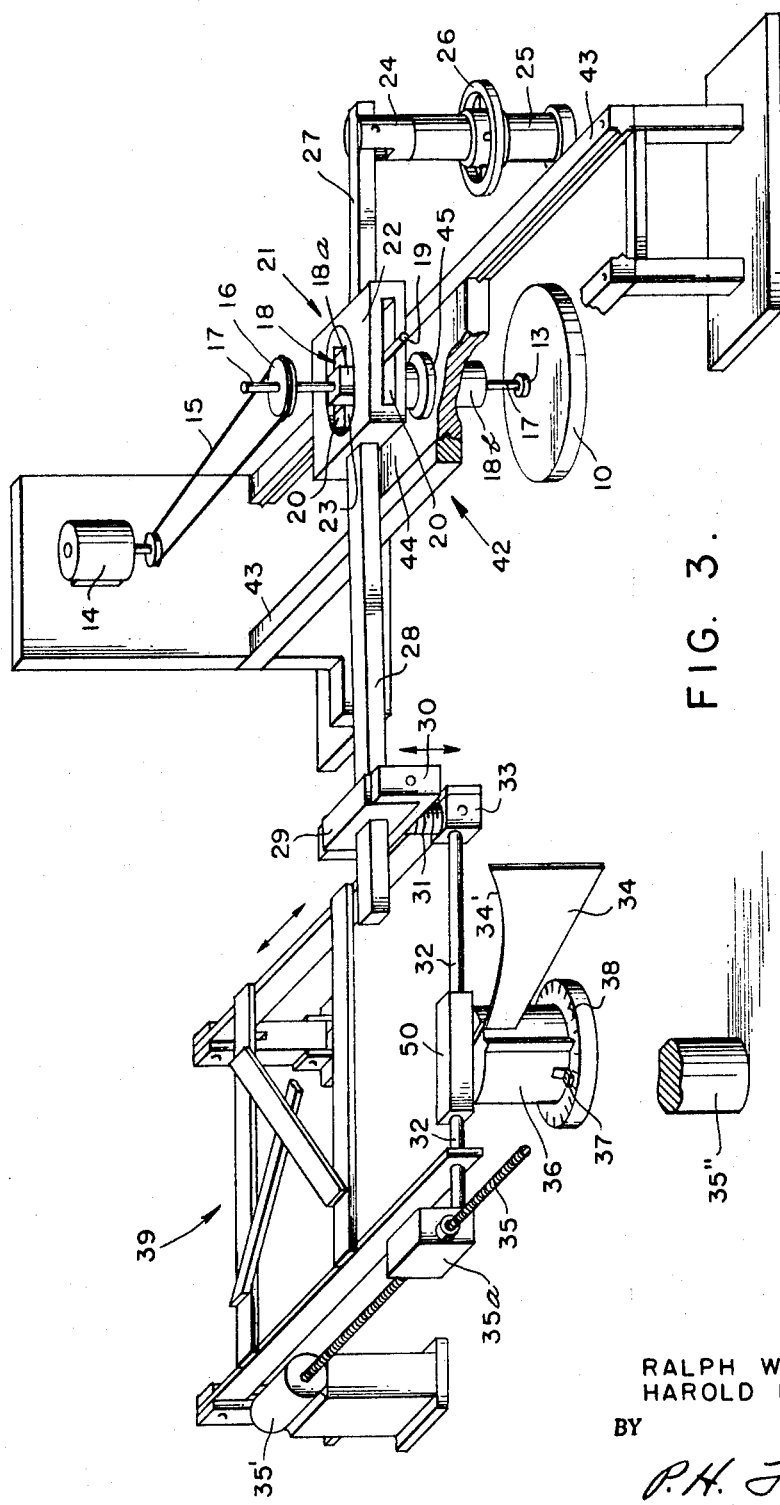

Other objects, advantages and novel features of the invention will become apparent from the following detailed description of the invention when considered in conjunction with the accompanying drawings wherein:

FIG. 1 is a side elevation, cross sectional view, of the aspheric generator of the present invention;
FIG. 2 is a top plan view of the aspheric generator illustrated in FIG. 1;
FIG. 3 is an enlarged perspective view illustrating, in part, a turntable, a working point, and control mechanism for imparting horizontal and vertical movements to the working point, as provided for in the present invention;
FIG. 4 is a diagrammatic view illustrating the relationship between various control points and paths traversed by the working point;
FIGS. 5 and 6 are cross sectional views of typical aspheric mirrors and lenses, which may be generated by the surface generator of the present invention; and
FIG. 7 is a schematic view illustrating foci point location for a given elliptical surface.

Referring now more specifically to the drawings, wherein like reference characters designate like or corresponding parts throughout the several views, there is shown in FIG. 1 an aspheric surface generator mounted on a supporting base or work stand S. Mounted on the uppermost surface of the stand S is a bearing supported, powered turntable 10. The turntable 10 may be powered, or driven, at proper speeds through any suitable means, such as a conventional motor and drive train, generally designated 11. A conventional bearing surface disposed within a bearing housing 12 serves to rotatably support and maintain the turntable 10 in a horizontally disposed position so that a work piece, or blank, may be secured by suitable means, not shown, at the center of the turntable's uppermost surface, and rotated any suitable rate or predetermined rotational speed, as dictated by speeds imparted to the turntable 10 through the motor and drive train 11.

It is to be understood that the rotational speeds imparted to the turntable supported work piece may be varied in accordance with various parameters, which are well-known to those skilled in the lens grinding art. Therefore, the specific turntable drive means and bearing support may be varied in any suitable manner in order to accommodate given surface forming operations.

For grinding or forming a mirror or lens into a desired configuration, a cutting tool 13, which may be in the form of a diamond tipped rotary working point, is vertically disposed above the work blank supporting surface of the turntable 10. The cutting tool 13 must be capable of having both radial and axial movements imparted thereto with respect to the turntable supported workpiece. The size and specific configuration of the working point may be varied, as found desirable, and may be driven by a high speed low torque, base mounted motor 14 through a suitable drive means, such as an expansion type or "stretchable" belt 15, FIGS. 2 and 3. The belt 15 preferably is of a type which may elongate and contract as tension thereon is caused to vary. The belt 15 is passed around a working point connected sheave 16, and functions to rotate the working point or cutting tool 13 at rates dictated by motor speed and sheave diameter.

The sheave 16 is connected to the working point 13 through a working point drive shaft 17. The working point 13 is operatively fixed at the lowermost end of the shaft 17 in a manner which permits the working point 13 to be rotated and displaced in accordance with the shaft's rotation and displacement.

An elongated and displaceable housing 18, FIG. 3, designed so as to possess a rectangular portion 18a and a cylindrical portion 18b, serves to surround the shaft 17 and functions as a support means therefor. Within the housing 18, there is provided a series of conventional bearing surfaces, not shown, which accommodate shaft rotation and precludes axial and radial shaft displacement, relative to the housing, so that vertical and horizontal shaft displacement may occur only as a result of vertical and horizontal displacement being imposed on the displaceable housing 18.

In order to impart vertical and horizontal displacement to the housing 18, and consequently the working point 13, the housing 18 is provided with a horizontally extending pair of pins 19, FIG. 3. The pins 19 are received in a pair of elongated, horizontally disposed pin receiving slots 20 provided in vertical surfaces of a displaceable floating cage, generally designated 21, and functions as means for connecting the housing 18 with the floating cage 21. The floating cage 21 comprises an elongated member 22 disposed in a horizontal plane and mounted in a manner which permits the cage 21 to be horizontally displaced along a path parallel to an intended working point path W–W′, FIG. 4, as defined through controlled horizontal displacement of the working point 13.

A housing passageway 23 extends vertically through the member 22, and serves to receive the uppermost portion of the housing 18a, whereby the pins 19 may extend laterally through the aforementioned slots 20 formed within the member 22. The passageway 23 is so dimensioned as to confine the housing 18 against displacement in directions extending along the working point path, but accommodates substantial displacement of the housing in directions at right angles to the path.

It is intended that the floating cage 21 be capable of being displaced in both vertical and horizontal arc describing directions about a given pivot point P, FIG. 4. The pivot point P is established by means of a universal joint or coupling 24 surmounting an extendable pivot post 25, which is vertically mounted on the stand S at a location adjacent the turntable 10. The coupling 24, and consequently the pivot point P, may be raised and lowered at will through any suitable means, such as, for example, a hand wheel 26. The hand wheel 26 serves to drive an internally threaded jack-screw, not shown, in a conventional manner for extending and retracting a portion of the post 25 along its longitudinal axis. The purpose of the jack-screw will hereinafter be more clearly set forth.

The coupling 24, and the floating cage 21, are coupled through a bar 27 having one end pivoted to the coupling 24 in a manner such that, in effect, the bar 27 forms a component of the universal coupling 24. The opposite end of the bar 27 is fixed to one end of the elongated floating cage member 22, and serves to vertically support one end of the cage 21, housing 18, and the working point 13. The opposite end of the member 22 is supported through a working bar 28 fixed at one end to the cage member 22 so as to be oppositely disposed from the fixed end of the bar 27. The opposite end of the bar 28 extends through a bearing surfaced opening provided in a horizontally pivoted sliding cage 29, and is slidingly supported thereby in a manner which accommodates an unrestricted reciprocation of the bar 28 therethrough.

A U-shaped swivel block 30 is mounted for horizontal rotation atop a vertical swivel post 31, and serves to support the sliding cage 29 so that the bar 28 may be universally pivoted about the uppermost end of the vertical swivel post 31. Hence, it is to be understood that floating cage 21 is in effect suspended between a pair of universal couplings, which serve to ensure unrestricted pivotal rotation of the floating cage 21 thereabout.

Displacement of the floating cage 21 is effected through a pivotal rotation of the working bar 28, relative to the fixed pivot point P, as the swivel block 30 is caused to traverse a predetermined path B–B′, FIG. 4, parallel to the working point's path W–W′, for thus causing the cage 21 to progress generally about the fixed pivot point P for imparting displacement to the shaft 17 and the working point 13.

For causing the predetermined path B–B′ to be traversed by the swivel block 30, there is provided a horizontally disposed template supported rider bar 32 mounted for displacement along a path C–C′, FIG. 4, also arranged parallel to the working point's path W–W′. The rider bar 32 is attached in a horizontal disposition, to the lowermost end of a vertical swivel post 31 through any suitable means, such as, for example, a threaded coupling block 33, and functions to support the swivel post 31, and consequently, serves as a supporting member for the floating cage 21. Any displacement of the rider bar 32 will therefore be transmitted through the block 30 to the floating cage 21 through the working bar 28.

A pivoted template 34, having an upper cam-like rider bar supporting suface 34′, is pivotally mounted at one end to extend generally in a transverse direction beneath the rider bar 32, and functions as a guide means for supporting the rider bar 32 as it is displaced along the path C–C′.

The rider bar 32 is caused to be displaced along the template supporting surface 34′ by any suitable means, such as, for example, an operably connected conventional worm gear 35, which may be connected through any suitable means, exemplified by a bearing block 35a, and supported and activated by any conventional means, such as a motor 35′ and a supporting post 35″. The configuration of the surface 34′ serves to dictate the extent of vertical displacement imparted to the working point 13 as it progresses along the horizontal path W–W′, FIG. 4, and consequently determines resulting work piece profile or surface configuration imparted to a given mirror, lens or other object being ground and shaped by the rotating cutting tool or working point 13. It is to be understood that where a concave supporting guide surface 34′ is provided for the template 34, a resulting concave surface, FIG. 5, will be imparted to the work piece being ground. On the other hand, it is entirely feasible to utilize the device for grinding a convex surface, FIG. 6, merely by providing a template having a rider bar supporting surface 34′ of a convex configuration, so that the working point 13 is caused to describe a desired configuration as it advances along the path W–W′.

It is to be particularly noted that the template 34 is pivotally mounted to rotate about a template pivot point T, FIG. 4, by means of a rotatable, vertically disposed template base 36, FIGS. 1–3, mounted in a manner which permits the template to be incrementally rotated through any desired angle α, which, if desired, may approach a right angle with respect to the template's zero position. The template's zero position may be defined as the position assumed when the template is disposed in a paralleled relationship with the working point's path W–W′. The template 34 is to be selectively retained in any desired position at a predetermined angle α by means, such as, for example, a spring-loaded stop-pin and detent device 37. Further, a conventional scaled marker plate 38 may be utilized as an aid for positioning the template as it is rotated to a predetermined angle α.

Once the rider bar 32 is mounted for movement along its path C–C′ and across the curved supporting surface 34′ of the template 34, rotated through an angle α, it is necessary to prevent an end-to-end pivoting thereof, since accurateness of the curve generated by the working point 13 depends largely upon a proper traverse of the path C–C′ by the rider bar 32. Therefore, a pivotal linkage, comprising a paralleling cage, generally designated 39, is pivoted to the base S, and is fixed to each end of bar 32 in order to maintain succeeding positions of the bar 32 in a parallel relationship as the bar is caused to traverse the curved surface 34′ of the template along the path C–C′.

In order to convert the horizontal pivotal movements of the working bar 28 to straight-line horizontal movements, as imparted to the housing 18 and consequently to the working point 13, it is necessary to utilize a working cage, generally designated 42. The cage 42 functions to control the working point's horizontal movements by guiding the housing 18 along its horizontal path parallel to working point's path W–W', and parallel path B–B'.

The working cage 42 comprises a pair of parallel rails 43 and a displaceable guide block 44, FIG. 3. The rails 43 are disposed parallel to the path W–W', and are supported by any suitable means secured to the work stand S. The rails 43 are arranged above the turntable 10 and function to slidingly receive and guide the guide block 44. Within the guide block 44, there is fixed a vertically disposed sleeve 45 mounted so as to extend vertically therethrough. The guide block 44 is mounted for horizontal displacement along the rails 43 by any suitable means, such as, for example, conventional tongue-and-groove guide-rail components.

The sleeve 45 receives the lowermost portion of the housing 18, and is so dimensioned as to maintain a sliding contact between the external surface of the housing portion 18b and the internal surfaces of the sleeve, so that the housing 18 may be vertically displaced within the sleeve in a manner which affords a raising and a lowering of the working point 13 while the working point is being caused to undergo displacement along path W–W'.

Since the working bar 28 is caused to describe an arc about the pivot post 25, or pivot point P, as the block 30 traverses path B–B', the pins 19 and slots 20 cooperate and function as lost-motion linkage for permitting the housing 18 to be confined to straight-line horizontal movements along a path parallel to the path B–B' of the block 30, and the path W–W', as described by the displacement of working point 13. Therefore, it is to be understood that the path W–W', described by the working point 13, is in effect a miniaturized version of path B–B'. The vertical profiles or configurations described by the swivel block 30 are dictated by the configuration of the rider bar supporting or guide surface 34', as provided for the pivotally mounted template 34. The paths and configurations described by the block 30 are miniaturized when described by the working point 13, according to the relationship which $l$, the distance from the pivot point P to the path W–W', bears to $d$, the distance from the pivot point P to the path B–B', or $l/d$. Therefore, the machine may be so designed as to be readily adapted for cutting mirrors and lenses of various and different dimensions, without imposing a requirement that a new template be utilized. For example, where $l$ equals 2, and $d$ equals 8, the displacement of the working point 13 will be ¼ that of the block 30. However, if $l$ is caused to equal 4, while $d$ remains equal to 8, the displacement of the working point will be ½ that of the block 30. Hence, while not shown, it is to be understood that various means may be provided for adapting the machine for cutting or grinding surfaces having various dimensions.

In operation, the actual point at which the cutting tool or working point 13 would ordinarily contact the work, as it is rotated on the turntable 10, does not define a "centered" or true work-point, therefore, a rectangular corrector bar 50, FIG. 3, is normally fixed to the rider bar 32 by any suitable means, in order to compensate for the misalignment of cutting tool or working point 13. As a practical matter, the dimensions of the corrector bar 50 are varied in accordance with the distances $d$ and $l$, and the diameter of the cutting tool or working point 13, whereby the effective width dimension of the bar 50 conforms to a dimension resulting when ratio $d/l$ is multiplied by the diameter of the particular cutting tool to be utilized. A similar adjustment may be made simply by replacing the rider bar 32 with one having the proper dimension, or, if desired, by providing means for tilting the housing 18 at appropriate angles so as to displace the working point, whereby a "centered" point of contact between the working point 13 and the work may be established.

When the template 34 is positioned at a given angle $\alpha$, FIG. 4, with the supporting surface 34' of the template 34 conforming to a given circular curve having a known radius, the working point 13 will trace out a predetermined ellipse, having characteristics dependent upon the radius of curvature provided for the surface 34', and the angle of template rotation $\alpha$, or the effective curvature of the template 34. A desired elliptical surface may be generated, using a given template 34, in the following manner. Where $f_1$ and $f_2$, FIG. 7, are to be the foci of a desired ellipse, as expressed in terms of their displacement above the center of a piece of work, the angle of template rotation $\alpha$ may be computed according to the equation:

$$\sin \alpha = \frac{\sqrt{f_1 \times f_2}}{f_1 + f_2}$$

Using this equation a plurality of angles $\alpha$ may be determined, whereby a single pivoted circular template 34 may be displaced to various positions to provide a plurality of effective curvatures or template configurations for generating a plurality of elliptical surfaces each having different curve characteristics.

Furthermore, a series of parabolic curves may be generated through the use of a single pivotally mounted template having a rider bar supporting surface 34' configuration conforming to a parabolic curve. The path traced by the working point or cutting tool 13 will describe a parabola, however, the characteristics of a reproduced parabola will necessarily depend upon the angle $\alpha$ through which the template 34 has been rotated from its zero position. Assuming, for example, that F equals a parabolic mirror focal length for a mirror, which would be generated with the template 34 positioned at a zero position, or a position parallel to the path B–B' at 90° with respect to the rider bar 32, and $f_3$ equals the focal length of a desired parabola, angle $\alpha$ may be determined according to the equation $\sin^2 \alpha = f_3/F$. Therefore, the angle $\alpha$, through which the template 34 must be rotated in order for the working point 13 to generate a desired parabolic curve, may be readily computed.

It is to be understood that similar relationships may be derived for other types of curves, such as hyperbolas and fourth order curves used by the Schmidt correcting plates.

The specific design of the machine permits operative accuracy to be readily determined, or checked, as it is necessary to merely observe the extent of existing parallel relationship or alignment present between the paths B–B' and W–W'. This observation may be performed through the use of conventional optical measuring device. If nonalignment exists, the machine may then be adjusted for enabling it to function with a high degree of accuracy. It is to be understood that even though there is utilized a template and rider bar fabricated with a low order of accuracy, it is still possible for the generator to function with accuracy. This results from an error reduction factor introduced by the relationship of $l$ to $d$, whereby, fabrication and production costs may be substantially reduced.

Error reduction may occur in instances where the corrector 50, or the guide surface 34' of the template 34, contain rough spots, improper dimensions, or minor variations from a predetermined curve. The variations will be reduced as they are reproduced by the working point 13, according to the relationship which $l$ bears to $d$. For example, where $l$ equals 2, and $d$ equals 8, an error reduction factor of ⅖ or ¼ will be realized whereby the variations, as they are generated on the blank, will have a value of ¼ that of the variations on the surface 34'.

In summarizing the operation of the device, it may be assumed that a template 34 having a desired surface configuration is positioned at a computed angle α. A blank or piece of work, which may have been "roughed-out" to an approximate surface, if so desired, is secured at the center of the turntable 10. The turntable is rotated or driven at a desired working speed, and the rider bar is disposed at a position so as to locate the working point or cutting tool 13 at the center of the piece of work so that the working point 13 may now be lowered, by means 26, into contact or into a working position with respect to the piece of work. In order to grind or cut the work to the desired configuration, it is merely necessary to activate the worm gear 35 in a rider bar advancing direction to drive the rider bar along the surface of the template 34 for causing the working point 13 to progress along the path W–W' for thus establishing a first "cut". If further "cuts" are desired, the rider bar 32 is retracted and the working point 13 again lowered, by operation of the hand wheel 26, and the worm gear 35 again activated to effect another "cut". As many cuts as desired may be accomplished in a similar fashion to provide a finished surface conforming to a desired configuration.

It is to be understood that the machine, or device, of the hereinabove described invention is susceptible of additional refinements, not herein illustrated. For example, while the "expansion-type" belt 15, which affords a "stretching" thereof, as tension is applied, functions quite satisfactorily in instances where it is necessary to displace the working point 13 only relatively short distances along the path W–W', however, various other arrangements are feasible to accommodate the intended working point displacement. For example, a spring loaded, variable diameter, "V-belt" sheave could be employed, or means which permit the motor 14 to be mounted in a fixed relationship with respect to the block 44 so as to be displaced therewith may be used. Additionally, it is to be understood that the worm gear 35, the rider bar 32, the template 34, and the paralleling cage 39 could be mounted on an adjustable, track-supported carriage so as to accommodate variations in the positioning of the swivel-block 30 to thus increase machine work handling capacity.

In view of the foregoing description, it is to be understood that the present invention provides an unique combination of aspheric surface generator components, through which a single pivoted template may be used for generating a plurality of aspheric surfaces with a high degree of accuracy.

Obviously many modifications and variations of the present invention are possible in the light of the above teachings. It is therefore to be understood that within the scope of the appended claims the invention may be practiced otherwise than as specifically described.

What is claimed is:
1. In a surface generator, the combination comprising:
a rotatable, horizontally disposed turntable for rotatably supporting a work blank;
a working bar transversely disposed above said turntable;
a fixed vertical pivot post for pivotally supporting a first end of said working bar in a manner such as to accommodate working bar pivotal displacement in both horizontal and vertical directions;
a vertically and horizontally movable working point;
means for operatively connecting said working point with said working bar in a manner such that the working bar serves to impart both a vertical and a horizontally transverse displacement to said working point relative to said turntable;
working point guide means for imposing a straight-line movement on said working point as it is caused to horizontally traverse said turntable;
a moveable pivot post for pivotally supporting a second end of said working bar in such a manner as to accommodate working bar pivotal movements in both vertical and horizontal directions;

means for imposing both a vertical and a straight-line horizontal displacement to said moveable pivot post for imparting movement to said working point through said working bar; and
means for establishing and maintaining a state of parallelism between the straight-line horizontal movements imparted to said working point and said moveable pivot post.

2. An aspheric generator comprising, in combination:
a base;
a horizontally disposed, work piece supporting turntable mounted on said base;
a vertically mounted pivot post fixed to said base adjacent said turntable;
means for raising and lowering said post relative to said turntable;
a first, universal coupling fixed to said post at its uppermost end;
a floating cage disposed above said turntable and connected with said coupling;
a cutting tool;
cutting tool support means connecting said cutting tool with said cage, including a horizontal lost-motion linkage;
guide means interposed between said lost-motion linkage and said cutting tool for guiding said cutting tool in straight-line displacement radially across said turntable.
a second universal coupling mounted in a displaced relationship with said cage;
means for connecting said second universal coupling with said cage whereby said cage is mounted between and vertically supported by said first and said universal couplings;
means including a rider bar for displacing said second universal coupling in both vertical and horizontal directions so that said cage may be caused to progress about said first universal coupling in vertical and horizontal arc defining fashions; and
a pivotally displaceable template mounted on said base having a rider bar guide surface of a predetermined effective configuration for dictating directions of vertical displacement for said second universal coupling for thus controlling vertical displacement of said cage, whereby as the rider bar is guided by said template, the cage is caused to progress about said first universal coupling for causing said cutting tool to be guided by said guide means across said turntable in a straight-line horizontal direction and in vertical directions by the effective configuration of said pivotally displaceable template.

3. In the generator of claim 2, means further comprising:
template positioning means for positioning said template at one of a plurality of positions to which the template may be pivotally displaced for altering the effective configuration of said rider bar guide surface.

4. Apparatus for generating an aspheric surface defined by the revolution of a desired plane curve, such as a conic section, about an axis of symmetry in its plane, comprising:
a work piece support to which a work piece may be affixed, and means for rotating the work piece support about said axis;
a cutting tool support disposed adjacent the work piece, supported for simultaneous feeding movements in a first direction radially of said axis and in a second direction in a plane containing said axis, whereby the simultaneous feeding movements causes a cutting tool, carried by the cutting tool support, to move along the desired plane curve and penetrate, due to the rotation of the work piece, the desired surface of revolution;
means for controlling the simultaneous movements of said work support, said means comprising an elongated template follower having a longitudinal axis;
means supporting said follower to restrain it to movements in which its longitudinal axis remains parallel in all positions of movement;
a fixed template having a curved edge corresponding to said desired plane curve, but of magnified extent, along which said follower is adapted to slide;
means for adjusting said edge to various positions angularly to the longitudinal axis of the follower, whereby the follower may be moved along a plurality of different aspheric curves, depending upon the angular position of the template; and
means operatively connecting said follower to said cutting tool support to effect reduced movements of the latter in accordance with movements of the former.

5. Apparatus in accordance with claim 4, wherein said last named means comprises an arm universally pivotally connected at one end to a fixed support and universally pivotally connected at its other end to said follower, an intermediate position being operatively connected to said cutting tool support for moving it in said first and second directions.

References Cited by the Examiner

UNITED STATES PATENTS

| | | | |
|---|---|---|---|
| 2,092,730 | 9/1937 | Flygare | 125—11.1 |
| 2,310,977 | 2/1943 | Mathys | 51—95 |
| 2,885,832 | 5/1959 | Briggs | 51—124 |
| 3,169,350 | 2/1965 | Corman | 51—127 |

HAROLD D. WHITEHEAD, *Primary Examiner.*

J. SPENCER OVERHOLSER, *Examiner.*

J. L. TATE, *Assistant Examiner.*